(12) United States Patent
Shen et al.

(10) Patent No.: US 10,587,519 B2
(45) Date of Patent: Mar. 10, 2020

(54) CLOS NETWORK LOAD BALANCING METHOD AND APPARATUS

(71) Applicant: Huawei Technologies Co., Ltd., Shenzhen (CN)

(72) Inventors: Li Shen, Nanjing (CN); Chuang Wang, Beijing (CN); Nongda Hu, Beijing (CN); Hewen Zheng, Beijing (CN); Jinfeng Yan, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 15/869,931

(22) Filed: Jan. 12, 2018

(65) Prior Publication Data

US 2018/0139139 A1    May 17, 2018

Related U.S. Application Data

(63) Continuation of application No. PCT/CN2016/075382, filed on Mar. 2, 2016.

(30) Foreign Application Priority Data

Jul. 16, 2015   (CN) .......................... 2015 1 0422183

(51) Int. Cl.
*H04L 12/803*   (2013.01)
*H04L 12/707*   (2013.01)
(Continued)

(52) U.S. Cl.
CPC ............ *H04L 47/125* (2013.01); *H04L 45/24* (2013.01); *H04L 45/74* (2013.01);
(Continued)

(58) Field of Classification Search
CPC ....... H04L 47/125; H04L 45/24; H04L 45/74; H04L 49/1515; H04L 2212/00; H04L 49/1569
See application file for complete search history.

(56) References Cited

U.S. PATENT DOCUMENTS

| 2009/0307334 A1* | 12/2009 | Maltz ................ H04L 29/12028 709/219 |
| 2012/0207018 A1* | 8/2012 | Goldenberg ............ H04L 12/12 370/230 |

(Continued)

FOREIGN PATENT DOCUMENTS

| CN | 102164088 A | 8/2011 |
| CN | 102185772 A | 9/2011 |
| CN | 102685782 A | 9/2012 |

OTHER PUBLICATIONS

Jain et al., "B4: Experience with a Globally-Deployed Software Defined WAN", Aug. 12-16, 2013, ACM SIGCOMM, SIGCOMM 13 (Year: 2013).*

(Continued)

*Primary Examiner* — Paul H Masur
*Assistant Examiner* — Michael K Phillips
(74) *Attorney, Agent, or Firm* — Slater Matsil, LLP

(57) ABSTRACT

Embodiments of the present disclosure disclose a Clos network load balancing method and apparatus. In certain embodiments, the method includes receiving, by a first switch, a first packet and determining, by the first switch, a third switch. The third switch is a switch in a second group of switches. The method includes performing, by the first switch, tunnel encapsulation on the first packet, a destination Internet Protocol (IP) address in a tunnel-encapsulated IP header being an IP address of a second switch. The method includes performing, by the first switch, Internet Protocol in Internet Protocol (IP-in-IP) encapsulation on the tunnel- (Continued)

encapsulated first packet and sending, by the first switch, the IP-in-IP encapsulated first packet.

20 Claims, 7 Drawing Sheets

(51) Int. Cl.
  *H04L 12/741* (2013.01)
  *H04L 12/933* (2013.01)
(52) U.S. Cl.
  CPC ...... *H04L 49/1515* (2013.01); *H04L 49/1569* (2013.01); *H04L 2212/00* (2013.01)

(56) References Cited

U.S. PATENT DOCUMENTS

| | | | | |
|---|---|---|---|---|
| 2014/0122755 | A1* | 5/2014 | Chandra | G06F 13/4022 710/106 |
| 2015/0006749 | A1 | 1/2015 | Hendel et al. | |
| 2015/0010001 | A1* | 1/2015 | Duda | H04L 45/74 370/392 |
| 2015/0124826 | A1* | 5/2015 | Edsall | H04L 12/4633 370/392 |
| 2015/0127701 | A1* | 5/2015 | Chu | H04L 45/22 709/201 |
| 2015/0244617 | A1* | 8/2015 | Nakil | G06F 9/45558 709/224 |

OTHER PUBLICATIONS

Perkins, C., "IP Encapsulation within IP", Network Working Group, Request for Comment: 2003, IBM, Category: Standards Track, Oct. 1996, 14 pages.

* cited by examiner

CLOS NETWORK LOAD BALANCING METHOD AND APPARATUS

CROSS-REFERENCE TO RELATED APPLICATIONS

This application is a continuation of International Application No. PCT/CN2016/075382, filed on Mar. 2, 2016, which claims priority to Chinese Patent Application No. 201510422183.0, filed on Jul. 16, 2015, both of which are hereby incorporated by reference in their entireties.

TECHNICAL FIELD

The present disclosure relates to the field of communications technologies, and in particular, to a Clos network load balancing method and apparatus.

BACKGROUND

In a data center network, sometimes a packet loss occurs in a switching network because of congestion. The packet loss in the switching network caused by congestion has the following two types: One type is a port conflict, and the other type is a downlink conflict. The port conflict includes scenarios in which, on a border of the switching network, when multiple flows are sent from a same egress port of a border switch that is directly connected to a terminal, a sum of traffic of multiple elephant flows exceeds a capacity of the port, thereby causing congestion. The downlink conflict includes scenarios in which multiple border switches in a network simultaneously send flows to a same core switch, where the core switch is configured to connect border switches in the network, and the flows are sent to a same destination border switch using the core switch; the core switch sends multiple elephant flows using a port connected to the destination border switch; and a sum of traffic of the multiple elephant flows exceeds a capacity of the port, thereby causing congestion because of aggregation of downlink traffic.

To avoid a packet loss, a border switch in the network performs load balancing on network traffic. A load balancing effect directly affects user experience. In a 3-stage Clos network, a generally used method is that, when sending a packet to a destination border switch, a source border switch selects a path with minimum load to send the packet to the destination border switch. For ease of description, in the following, a path between the source border switch and the core switch is referred to as an uplink, and a path between the core switch and the destination border switch is referred to as a downlink.

When the source border switch sends a packet to the destination border switch, a path tag (a field name: LBTag) and congestion extent (a field name: CE) are encapsulated in a Virtual Extensible Local Area Network (VXLAN) header in each packet. The LBTag is a port number used by the source border switch to send the packet, and the CE is used to represent a congestion metric value of a packet transmission path. In this example, a value of the CE is 0. After the packet passes through the core switch, the core switch updates a CE value of the packet to a congestion metric value of the downlink. After the packet is sent to the destination border switch, the destination border switch temporarily stores the congestion metric value of the downlink.

When sending a backward packet to the source border switch, the destination border switch encapsulates the temporarily stored congestion metric value of the downlink in feedback congestion metric (a field name: FB_Metric) in a large Layer-2 header and encapsulates an identifier of the destination border switch and a port number used by the destination border switch to send the backward packet in a feedback path tag (a field name: FB_LBTag) in the large Layer-2 header. In this way, the source border switch may determine a congestion status of the whole path according to a congestion value of the uplink of the source border switch and the congestion metric value of the downlink that is sent by the destination border switch, and further determine a path with minimum load from the source border switch to the destination border switch. However, the foregoing method is applicable to only a 3-stage Clos network, and is not applicable to a large scale deep-layer Clos network architecture.

SUMMARY

Embodiments of the present disclosure provide a Clos network load balancing method and apparatus, so as to resolve a problem that a 3-stage Clos network load balancing method is not applicable to a large scale deep-layer Clos network architecture.

To achieve the foregoing objective, the following technical solutions are used in the embodiments of the present disclosure.

According to a first aspect, an embodiment of the present disclosure provides a Clos network load balancing method. The method is applied to a multistage switching network system that includes border switches and at least one intermediate switch. The border switches include a first border switch and a second border switch. The Clos network includes a first group of switches and a second group of switches. Any switch in the first group of switches connects to at least one switch in the second group of switches. Any two switches in the first group of switches are connected using multiple paths, and any path in the multiple paths includes at least one switch in the second group of switches. The first group of switches includes a first switch and a second switch. The method includes receiving, by the first switch, a first packet. A destination Internet Protocol (IP) address of the first packet is an IP address of a terminal connected to the second switch. The method further includes determining, by the first switch, a third switch. The third switch is a switch in the second group of switches, and the first switch and the second switch are connected using the third switch. The method further includes performing, by the first switch, tunnel encapsulation on the first packet. A destination IP address in a tunnel-encapsulated IP header is an IP address of the second switch. The method further includes performing, by the first switch, Internet Protocol in Internet Protocol (IP-in-IP) encapsulation on the tunnel-encapsulated first packet. An IP-in-IP encapsulated inner IP header is the tunnel-encapsulated IP header, and a destination IP address in an IP-in-IP encapsulated outer IP header is an IP address of the third switch. The method further includes sending, by the first switch, the IP-in-IP encapsulated first packet.

With reference to the first aspect, in a first possible implementation of the first aspect, determining, by the first switch, a third switch includes determining, by the first switch, the third switch according to the IP address of the second switch and a parameter set of paths from the first switch to the second switch. The parameter set of the paths from the first switch to the second switch includes a parameter of at least one path in the multiple paths that connect the first switch and the second switch, and the parameter includes an IP address of a switch on the path to which the parameter belongs and a metric value of the path to which the parameter belongs.

With reference to the first aspect or the first possible implementation of the first aspect, in a second possible implementation of the first aspect, the tunnel-encapsulated IP header includes an identifier of the third switch and a first time. The first time is a current time of the first switch.

With reference to the second possible implementation of the first aspect, in a third possible implementation of the first aspect, the metric value of the path to which the parameter belongs includes a delay of the path to which the parameter belongs. Additionally, after sending, by the first switch, the IP-in-IP encapsulated first packet, the method further includes receiving a second packet sent by the second switch. The second packet is a tunnel-encapsulated packet. A tunnel header of the second packet includes the identifier of the third switch. The tunnel header of the second packet further includes a first delay or a second time, the second time being a time at which the second switch receives the first packet and the first delay being a difference between the second time and the first time. In addition to receiving the second packet sent by the second switch, the method further includes, after sending, by the first switch, the IP-in-IP encapsulated first packet, updating, by the first switch to the first delay in the second packet, a delay that is of a path on which the third switch is located and that is in the parameter set of the paths from the first switch to the second switch. Alternatively, in addition to receiving the second packet sent by the second switch, the method further includes, after sending, by the first switch, the IP-in-IP encapsulated first packet, updating, to the difference between the second time in the second packet and the first time, a delay that is of a path on which the third switch is located and that is in the parameter set of the paths from the first switch to the second switch.

With reference to the first aspect or the second possible implementation of the first aspect, in a fourth possible implementation of the first aspect, determining, by the first switch, a third switch includes receiving, by the first switch, a third packet sent by the second switch, the third packet carrying the identifier of the third switch determined by the second switch, and obtaining, by the first switch, the identifier of the third switch in the third packet.

With reference to any one of the first aspect or possible implementations of the first aspect, in a fifth possible implementation of the first aspect, the method further includes receiving, by the first switch, a fourth packet sent by a fourth switch and sending, by the first switch, a fourth time or a second delay to the fourth switch. The fourth switch belongs to the first group of switches, and the fourth packet carries a third time. The fourth time is a time at which the first switch receives the fourth packet, and the second delay is a difference between the fourth time and the third time.

According to a second aspect, an embodiment of the present disclosure provides a Clos network load balancing apparatus. The Clos network includes a first group of switches and a second group of switches. Any switch in the first group of switches connects to at least one switch in the second group of switches. Any two switches in the first group of switches are connected using multiple paths, and any path in the multiple paths includes at least one switch in the second group of switches. The first group of switches includes a first switch and a second switch. The apparatus is located on the first switch and includes a receiving unit, a determining unit, a first encapsulation unit, a second encapsulation unit, and a sending unit. The receiving unit is configured to receive a first packet, a destination IP address of the first packet being an IP address of a terminal connected to the second switch. The determining unit is configured to determine a third switch, the third switch being a switch in the second group of switches and the first switch and the second switch being connected using the third switch. The first encapsulation unit is configured to perform tunnel encapsulation on the first packet, a destination IP address in a tunnel-encapsulated IP header being an IP address of the second switch. The second encapsulation unit is configured to perform IP-in-IP encapsulation on the tunnel-encapsulated first packet, an IP-in-IP encapsulated inner IP header being the tunnel-encapsulated IP header and a destination IP address in an IP-in-IP encapsulated outer IP header being an IP address of the third switch. The sending unit is configured to send the IP-in-IP encapsulated first packet.

According to the second aspect, in a first possible implementation of the second aspect, the determining unit is configured to determine the third switch according to the IP address of the second switch and a parameter set of paths from the first switch to the second switch. The parameter set of the paths from the first switch to the second switch includes a parameter of at least one path in the multiple paths that connect the first switch and the second switch. The parameter includes an IP address of a switch on the path to which the parameter belongs and a metric value of the path to which the parameter belongs.

With reference to the second aspect or the first possible implementation of the second aspect, in a second possible implementation of the second aspect, the tunnel-encapsulated IP header includes an identifier of the third switch and a first time. The first time is a current time of the first switch.

With reference to the second possible implementation of the second aspect, in a third possible implementation of the second aspect, the metric value of the path to which the parameter belongs includes a delay of the path to which the parameter belongs, and the receiving unit is further configured to receive a second packet sent by the second switch. The second packet is a tunnel-encapsulated packet, and a tunnel header of the second packet includes the identifier of the third switch. The tunnel header of the second packet further includes a first delay or a second time, the second time being a time at which the second switch receives the first packet and the first delay being a difference between the second time and the first time. Additionally, the apparatus further includes an updating unit configured to update, to the first delay in the second packet, a delay that is of a path on which the third switch is located and that is in the parameter set of the paths from the first switch to the second switch, or update, to the difference between the second time in the second packet and the first time, a delay that is of a path on which the third switch is located and that is in the parameter set of the paths from the first switch to the second switch.

With reference to the second aspect or the second possible implementation of the second aspect, in a fourth possible implementation of the second aspect, the receiving unit is further configured to receive a third packet sent by the second switch. The third packet carries the identifier of the third switch that is determined by the second switch and used by the first switch to send the packet to the second switch. The apparatus further includes an obtaining unit configured to determine the third switch according to the identifier of the third switch in the third packet.

With reference to any one of the second aspect or possible implementations of the second aspect, in a fifth possible implementation of the second aspect, the receiving unit is further configured to receive a fourth packet sent by a fourth switch. The fourth switch belongs to the first group of switches, and the fourth packet carries a third time. The sending unit is further configured to send a fourth time or a second delay to the fourth switch. The fourth time is a time at which the first switch receives the fourth packet, and the second delay is a difference between the fourth time and the third time.

According to the Clos network load balancing method and apparatus provided in certain embodiments of the present disclosure, after receiving the packet, the first switch first determines the third switch that connects the first switch and the second switch, then performs tunnel encapsulation on the packet, the destination IP address in the tunnel-encapsulated IP header being the IP address of the second switch. The first switch performs IP-in-IP encapsulation on the tunnel-encapsulated packet, the destination IP address in the IP-in-IP encapsulated outer IP header being the IP address of the third switch. Therefore, when sending the packet, the first switch first sends the packet to the third switch according to the IP address of the third switch in the IP-in-IP encapsulated outer IP header, and then sends the packet to the second switch according to the IP address of the second switch in the tunnel-encapsulated IP header. Therefore, in a large-scale deep-layer Clos network architecture (e.g., in a 5-stage Clos network), because a path from the first switch to the third switch is unique and a path from the third switch to the second switch is unique, the third switch may be changed in this forwarding manner, so as to change a path from the first switch to the second switch, allowing a traffic path in the large-scale deep-layer Clos network architecture to be finely controlled, to implement network load balancing.

BRIEF DESCRIPTION OF THE DRAWINGS

To describe the technical solutions in the embodiments of the present disclosure more clearly, the following briefly describes the accompanying drawings required for describing the embodiments. The accompanying drawings in the following description show merely some embodiments of the present disclosure, but modifications on these embodiments are possible without departing from the spirit and scope of the present application as defined in the claims.

DETAILED DESCRIPTION OF ILLUSTRATIVE EMBODIMENTS

In a large-scale deep-layer Clos network (e.g., a 5-stage Clos network) architecture, there may be multiple paths from a port of a border switch to another border switch. If a port number used to send a packet is used as an adjustment granularity of traffic, traffic switching between the multiple paths cannot be finely controlled, and consequently a poor load balancing effect may result.

The following describes the technical solutions in embodiments of the present disclosure with reference to the accompanying drawings. To make advantages of technical solutions of embodiments of the present disclosure clearer, the following describes the present disclosure in detail with reference to the accompanying drawings and embodiments.

Embodiments of the present disclosure are applicable to a Clos network. In embodiments of the present disclosure, switches in the Clos network are classified into two types: a first group of switches and a second group of switches. A switch in the first group of switches is a border switch, and a switch in the second group of switches is another switch other than a border switch. Any switch in the first group of switches connects to at least one switch in the second group of switches. Any two switches in the first group of switches are connected using multiple paths, and any path in the multiple paths includes at least one switch in the second group of switches. Any path in the multiple paths includes only a switch in the second group of switches, that is, any two switches in the first group of switches are not directly connected.

Figure 1:
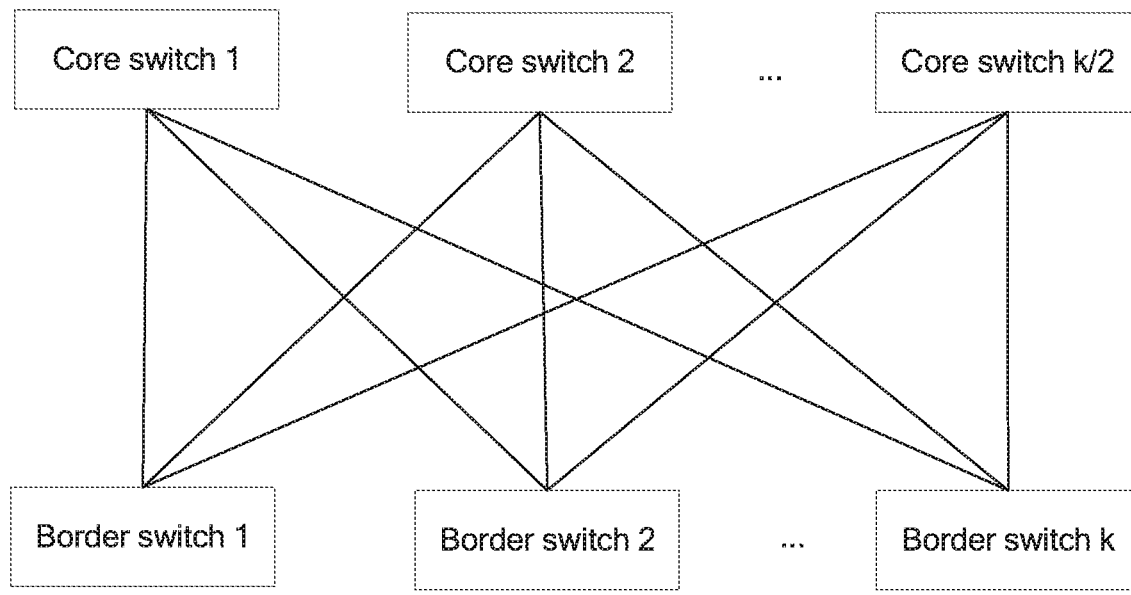
FIG. 1 is a schematic diagram of a network architecture according to an embodiment of the present disclosure.
Figure 2:
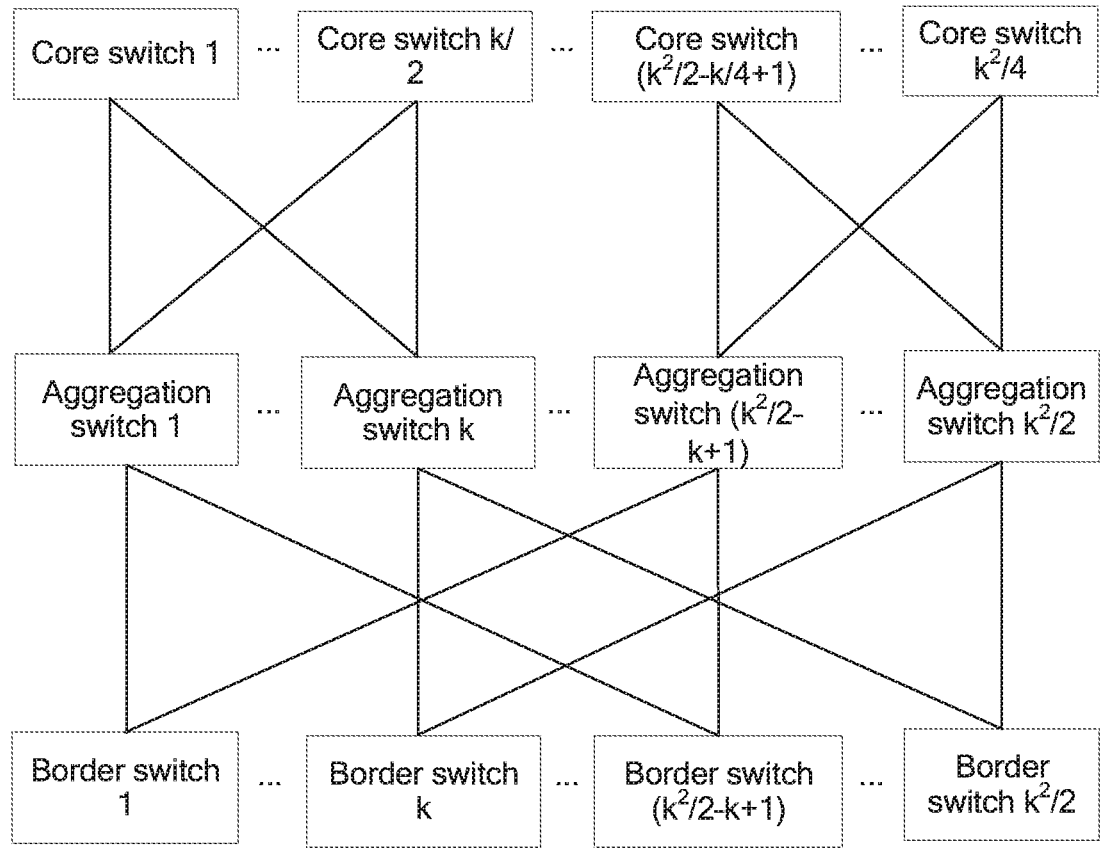
FIG. 2 is a schematic diagram of a network architecture according to an embodiment of the present disclosure.

For example, in a 3-stage Clos network architecture shown in FIG. 1, border switches located on a network border are the first group of switches, and core switches configured to connect the border switches are the second group of switches. In a 5-stage Clos network architecture shown in FIG. 2, border switches located on a network border are the first group of switches, and switches configured to connect the border switches are the second group of switches.

Figure 3:
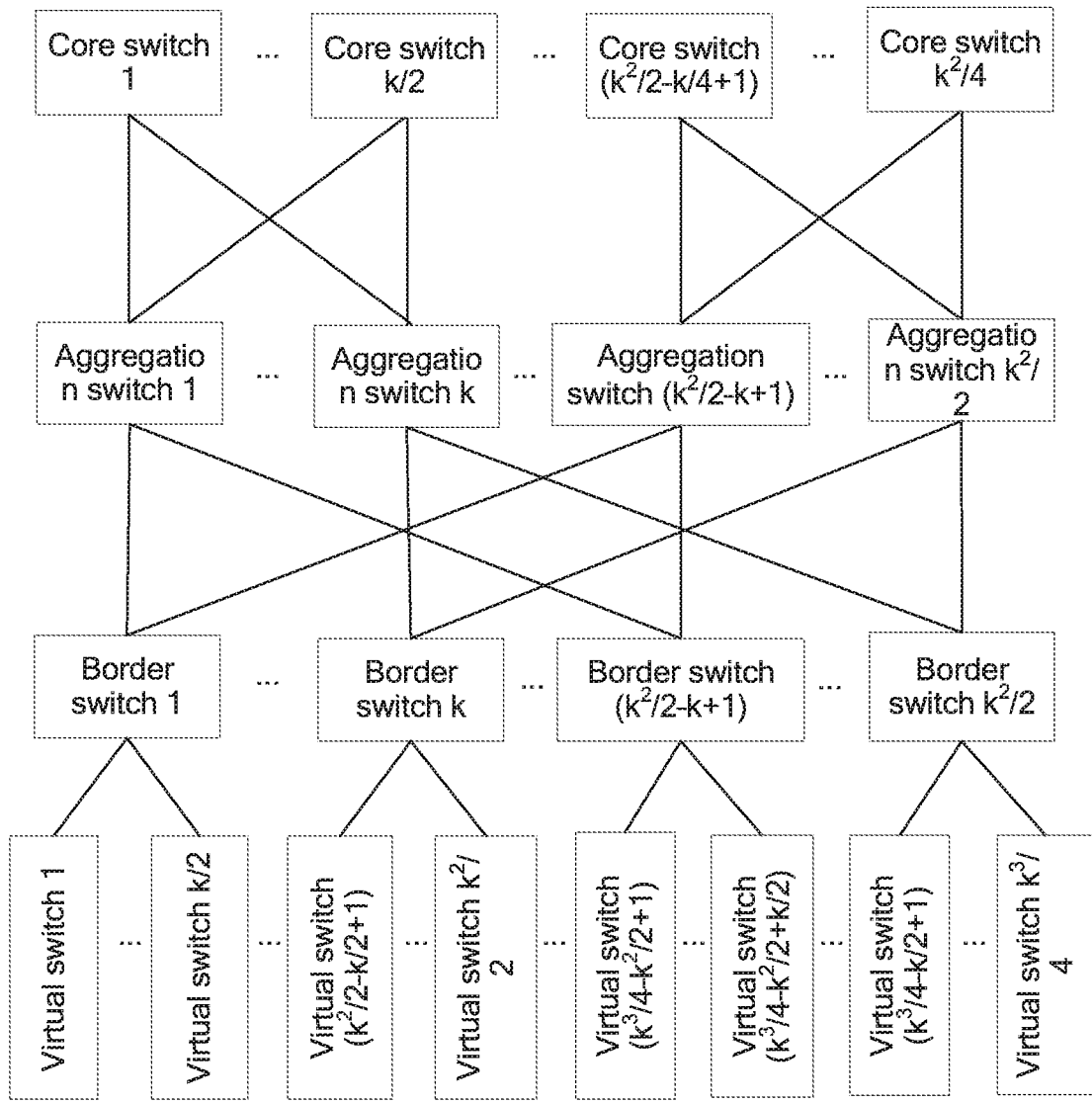
FIG. 3 is a schematic diagram of a network architecture according to an embodiment of the present disclosure.

The second group of switches is classified into two types: an aggregation switch that is directly connected to at least one of the border switches, and a core switch that is not directly connected to the border switch. In a 5-stage Clos network architecture including virtual switches shown in FIG. 3, the virtual switches located on a server are the first group of switches, and switches configured to connect the border switches are the second group of switches.

Figure 4:
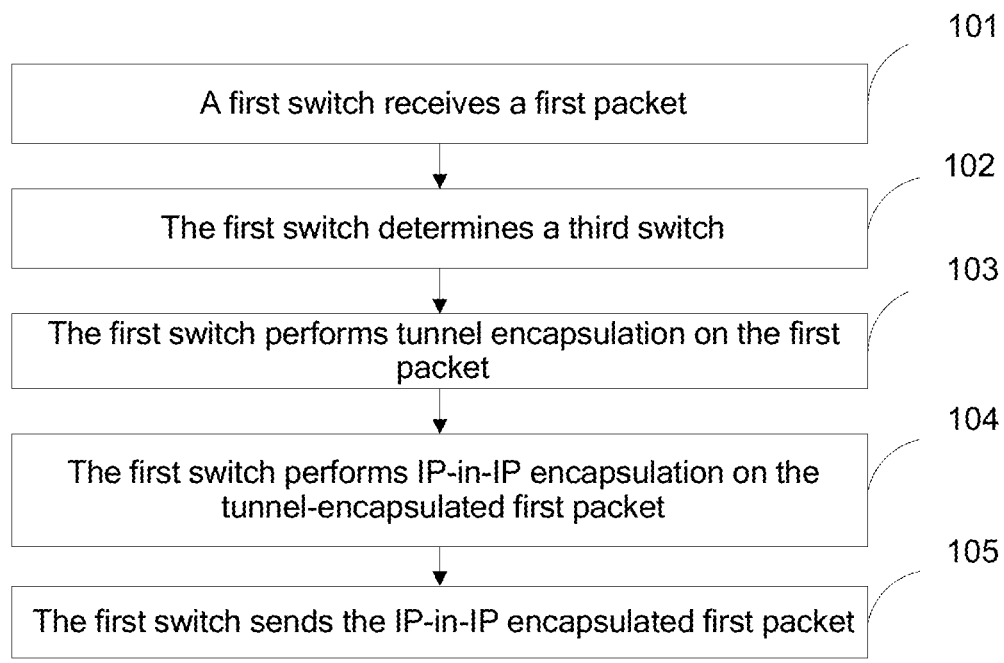
FIG. 4 is a flowchart of a method according to an embodiment of the present disclosure.

An embodiment of the present disclosure provides a Clos network load balancing method. As shown in FIG. 4, the method includes the following steps.

101. The first switch receives a first packet.

A destination Internet Protocol (IP) address of the first packet is an IP address of a terminal connected to the second switch.

The first switch may query preset mapping according to the destination IP address of the first packet and determine an IP address of the second switch. The preset mapping is a mapping from IP addresses of multiple terminals to IP addresses of multiple switches in the first group of switches.

102. The first switch determines a third switch.

The third switch is a switch in the second group of switches, and the first switch and the second switch are connected using the third switch. In this step, an identifier or an IP address of the third switch may be determined.

Figure 5:
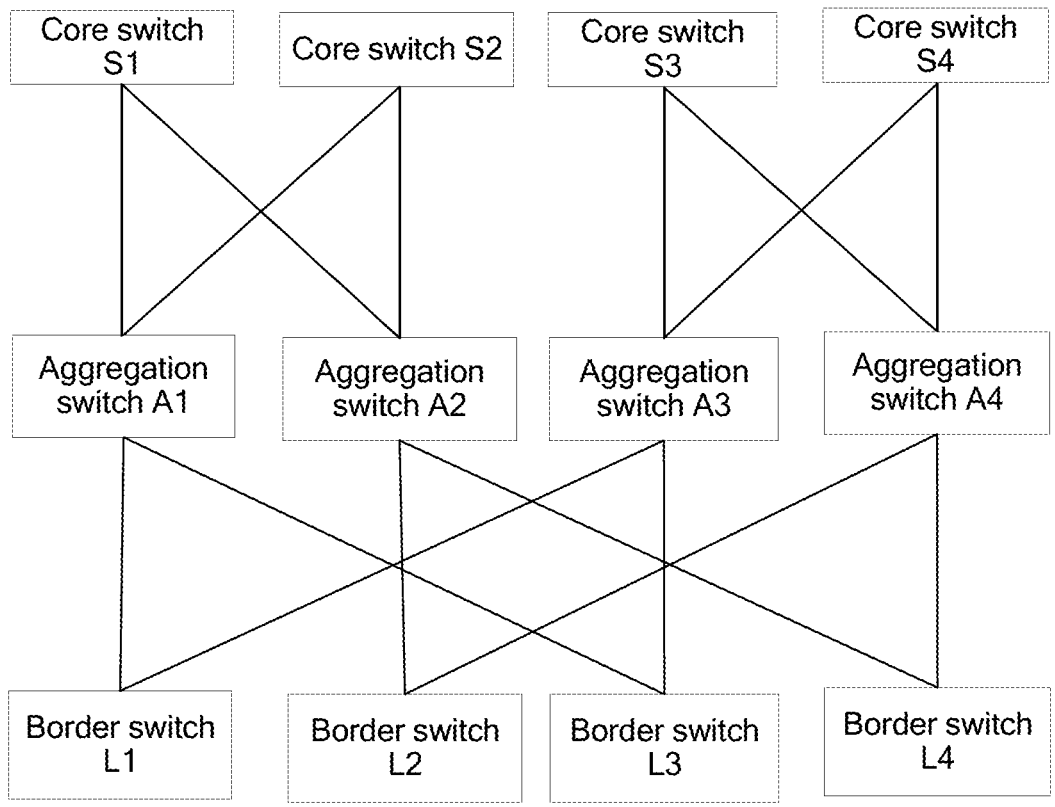
FIG. 5 is a schematic diagram of a network architecture according to another embodiment of the present disclosure.

In the Clos network, a path between any two switches in the first group of switches may be identified by a switch of the second group on the path between the two switches. For example, in a simplified 5-stage Clos network architecture shown in FIG. 5, switches are grouped into different pools of devices (POD). L1, L3, L2, and L4 are the first group of switches. A1, A3, A4, A2, A4, S1, and S2 are the second group of switches. L1, L3, A1, and A3 form a POD 1. L2, A4, A2, and L4 form a POD 2. Packet transmission between L1 and L3 can be completed using only A1 or A3, that is, A1 or A3 may uniquely represent a path between L1 and L3. S1 or S2 is used to complete packet transmission between L1 and L4, and if S2 is on a path between L1 and L4, the packet transmission path is determined as L1->A1->S2->A2->L4. That is, S1 or S2 may uniquely represent a path between L1 and L4.

However, in a large-scale deep-layer Clos network architecture, if a path is identified using a conventional IP address of a source border switch and a port number used by the source border switch to send a packet, after the packet is transmitted to a switch of a second group that is connected to the source border switch, there are more than one paths used to transmit the packer to a destination border switch. In this case, the switch of the second group that is connected to the source border switch cannot determine a path to the destination border switch. For example, in a 5-stage Clos network shown in FIG. 5, a packet is transmitted between L1 and L4, and if L1 determines that an egress port used to send the packet is connected to A1, after the packet is transmitted to A1, a path used to transmit the packet to L4 cannot be determined. Therefore, a load balancing effect is poor. In this embodiment of the present disclosure, a switch in the second group of switches is used to determine a path.

103. The first switch performs tunnel encapsulation on the first packet.

A destination IP address in a tunnel-encapsulated IP header is the IP address of the second switch. The tunnel encapsulation may be Virtual Extensible Local Area Network (VXLAN) encapsulation or Transparent Interconnection of Lots of Links (TRILL) encapsulation.

104. The first switch performs IP-in-IP encapsulation on the tunnel-encapsulated first packet.

An IP-in-IP encapsulated inner IP header is the tunnel-encapsulated IP header, and a destination IP address in an IP-in-IP encapsulated outer IP header is the IP address of the third switch. An IP-in-IP encapsulated source IP address is an IP address of the first switch.

105. The first switch sends the IP-in-IP encapsulated first packet.

In embodiments of the present disclosure, after receiving the packet, the first switch first determines the third switch that connects the first switch and the second switch. The first switch then performs tunnel encapsulation on the packet, the destination IP address in the tunnel-encapsulated IP header being the IP address of the second switch, and performs IP-in-IP encapsulation on the tunnel-encapsulated packet, the destination IP address in the IP-in-IP encapsulated outer IP header being the IP address of the third switch. Therefore, when sending the packet, the first switch first sends the packet to the third switch according to the IP address of the third switch in the IP-in-IP encapsulated outer IP header, and then sends the packet to the second switch according to the IP address of the second switch in the tunnel-encapsulated IP header. In a large-scale deep-layer Clos network architecture, (e.g. in a 5-stage Clos network), because a path from the first switch to the third switch is unique and a path from the third switch to the second switch is unique, the third switch may be changed in this forwarding manner, so as to change a path from the first switch to the second switch, allowing a traffic path in the large-scale deep-layer Clos network architecture to be finely controlled, to implement network load balancing.

In an implementation of this embodiment of the present disclosure, in step 102, the first switch may determine the third switch according to the IP address of the second switch and a parameter set of paths from the first switch to the second switch.

The parameter set of the paths from the first switch to the second switch includes a parameter of at least one path in the multiple paths that connect the first switch and the second switch. The parameter includes an IP address or an identifier of a switch on the path to which the parameter belongs and a metric value of the path to which the parameter belongs. The metric value may be any one or a combination of data traffic, idle bandwidth, bandwidth usage, and a delay of the path.

In this embodiment of the present disclosure, a metric value may reflect congestion extent of the multiple paths between the first switch and the second switch. The first switch may determine the third switch using a weighting calculation according to a metric value or may determine a relatively small or a minimum metric value of congestion by sorting metric values, and determining an IP address or an identifier of a switch on a path to which the metric value belongs as the IP address or the identifier of the third switch.

The first switch uses packets to be sent to a same second switch as one flow. After receiving a packet, the first switch divides the flow into different sub-flows (flowlet) according to a destination IP address of the packet and a time interval between a time of receiving the packet and a time of receiving a previous packet by the first switch. When receiving a packet, the first switch obtains a time interval between a time of receiving, by the first switch, the packet and a time of receiving a previous packet in the flow in which the packet is located, and determines whether the time interval reaches a preset value. If the time interval reaches the preset value, the first switch determines the packet as a first packet of a new sub-flow of the flow in which the packet is located. Therefore, if the first switch forwards a packet by flow forwarding, the first switch may determine the third switch in the following manner: If the first switch determines the first packet as a first packet of a new sub-flow, the first switch determines the third switch in the manner in this implementation, and stores the identifier or the IP address of the third switch in a flow entry corresponding to the new sub-flow in a flow table. If the first packet is not a first packet of a new sub-flow, the first switch directly queries a flow table to obtain the identifier or the IP address of the third switch.

Figure 6:
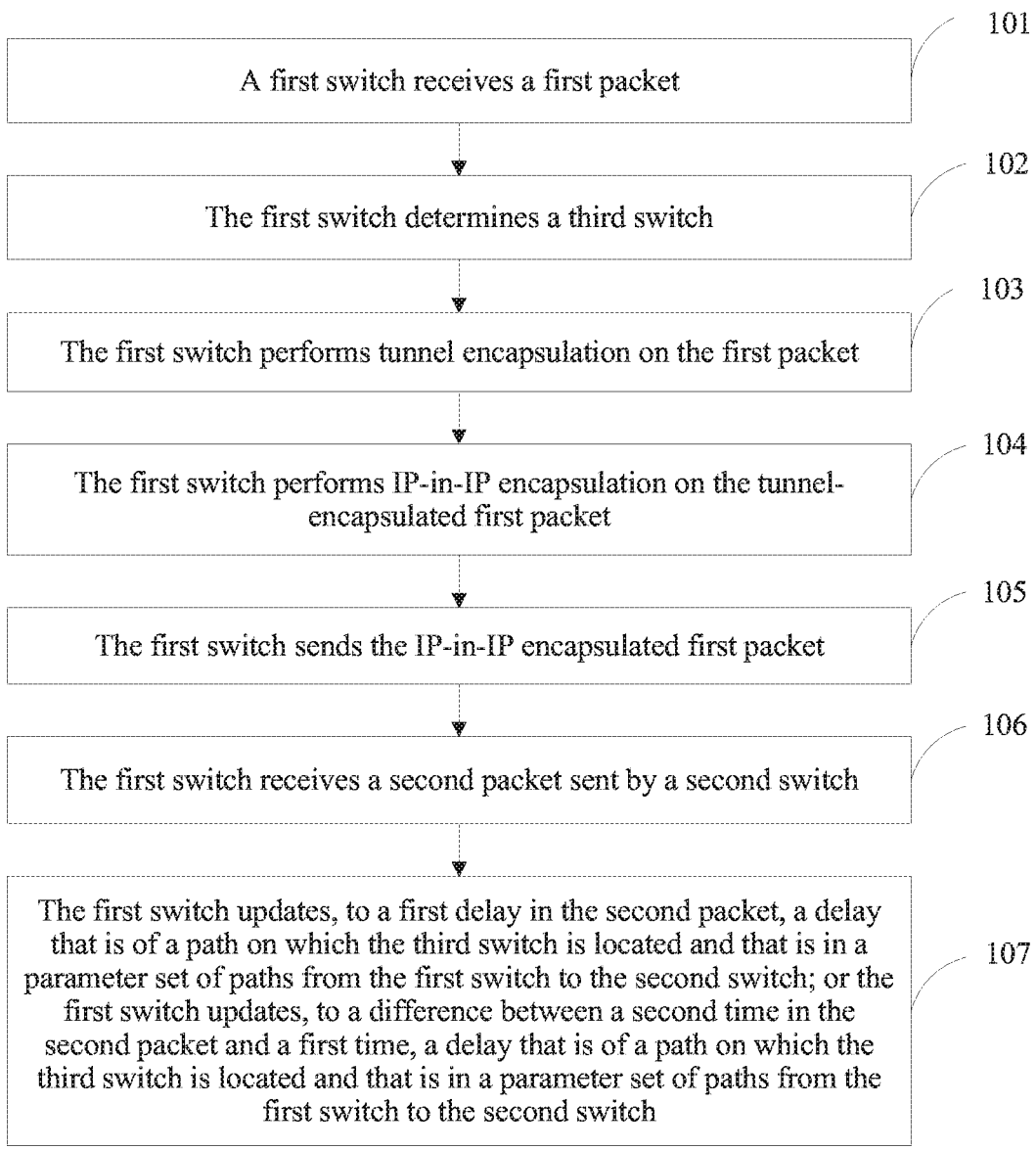
FIG. 6 is a flowchart of a method according to another embodiment of the present disclosure.

In another implementation of this embodiment of the present disclosure, as shown in FIG. 6, the metric value of the path to which the parameter belongs includes a delay of the path to which the parameter belongs. Therefore, in step 103, the tunnel-encapsulated IP header includes the identifier of the third switch and a first time, the first time being a current time of the first switch. After step 105, this embodiment of the present disclosure further includes the following steps.

106. The first switch receives a second packet sent by the second switch.

The second packet is a tunnel-encapsulated packet. A tunnel header of the second packet includes the identifier of the third switch. The tunnel header of the second packet further includes a first delay or a second time, the second time being a time at which the second switch receives the first packet and the first delay being a difference between the second time and the first time.

107. The first switch updates, to a first delay in the second packet, a delay that is of a path on which the third switch is located and that is in a parameter set of paths from the first switch to the second switch. Alternatively the first switch updates, to a difference between a second time in the second packet and a first time, a delay that is of a path on which the third switch is located and that is in a parameter set of paths from the first switch to the second switch.

In this implementation, delays of the paths between the first switch and the second switch are determined based on a same transmit end and a same receive end. Thus, time synchronization is not required between the first switch and the second switch.

In this implementation, in the foregoing procedures, the first switch may determine the delay of the path on which the third switch is located and update the parameter set of the paths from the first switch to the second switch, so that when subsequently sending a packet to the second switch, the first switch can determine a third switch according to an updated parameter set of the paths to perform load balancing, so as to improve accuracy of load balancing of the first switch.

Figure 7:
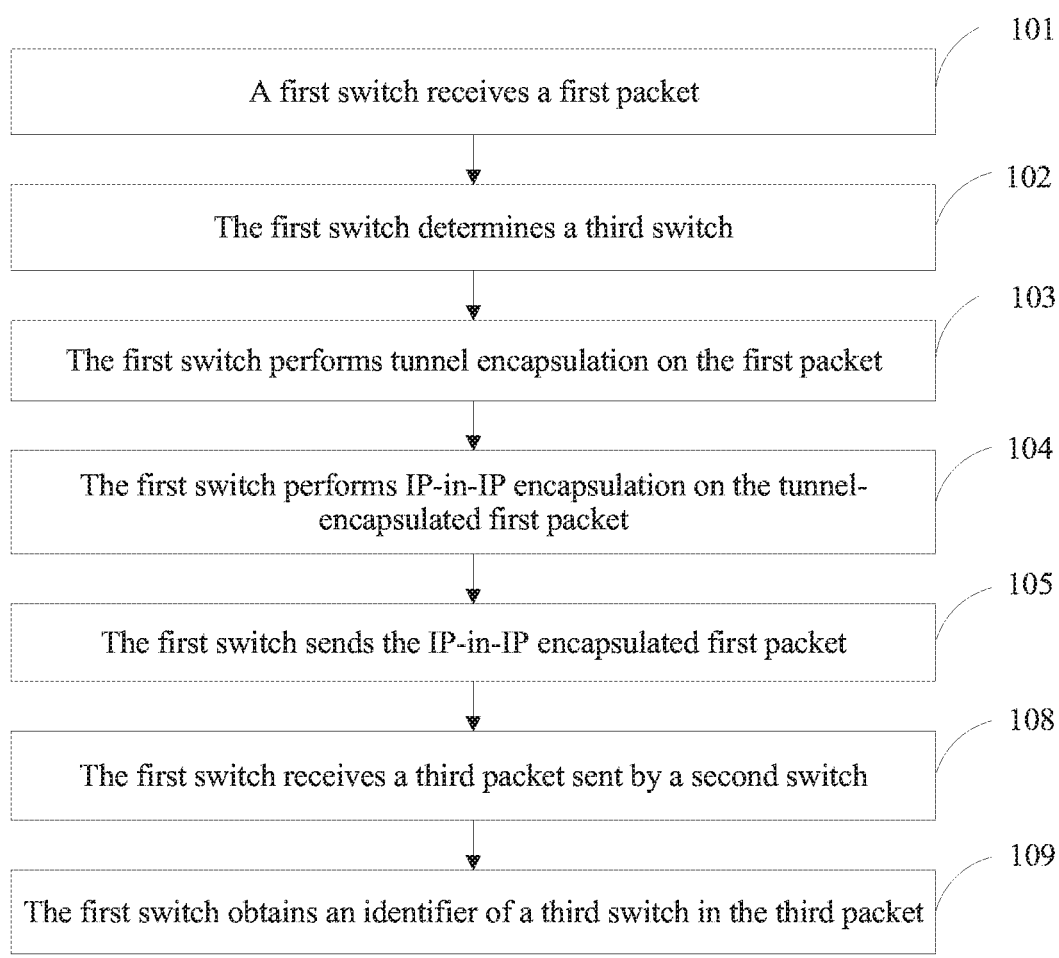
FIG. 7 is a flowchart of a method according to another embodiment of the present disclosure.

In another implementation of this embodiment of the present disclosure, as shown in FIG. 7, after step 105, this embodiment of the present disclosure further includes the following steps.

108. The first switch receives a third packet sent by a second switch.

The third packet carries the identifier of the third switch that is determined by the second switch and used by the first switch to send the packet to the second switch.

Step 109: The first switch obtains an identifier of the third switch in the third packet.

The second switch stores the parameter set of the paths from the first switch to the second switch, and the parameter includes an IP address or an identifier of a switch on the path to which the parameter belongs, and a metric value of the path to which the parameter belongs. After receiving the first packet, the first switch may determine, according to a related parameter of the first packet, a metric value of a path on which the third switch is located, and update a metric value that is of the path on which the third switch is located and that is in the parameter set of the paths, so as to determine, according to the parameter set of the paths, a path that is currently suitable for transmitting a packet from the first switch to the second switch. If the determined path that is currently suitable for transmitting a packet from the first switch to the second switch is different from a path used to transmit the first packet, the second switch sends, to the first switch using the third packet, an identifier of the path that is currently suitable for transmitting a packet from the first switch to the second switch, so that when subsequently sending a packet to the second switch, the first switch may determine the identifier, sent by the second switch, of the switch used by the first switch to send a packet to the second switch as an identifier of a third switch for load balancing, so as to improve accuracy of load balancing of the first switch.

Figure 8:
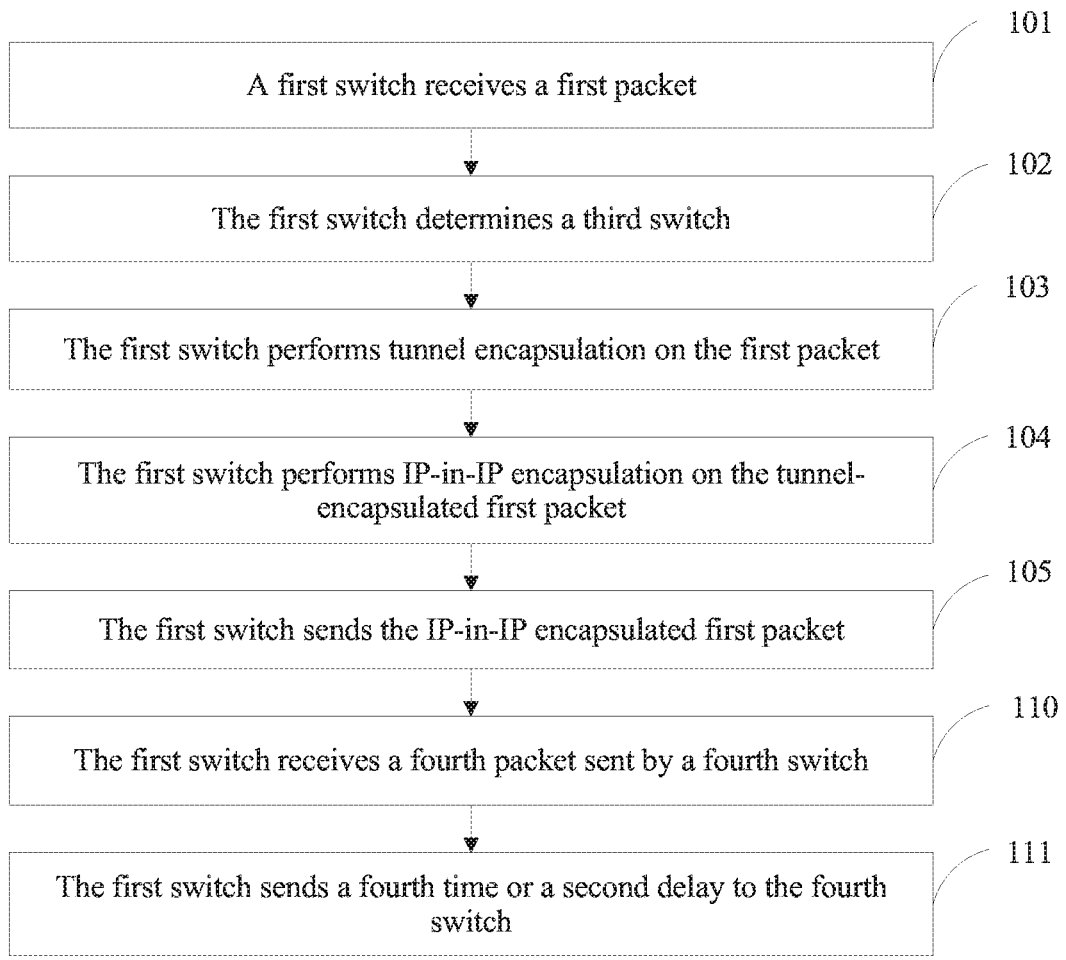
FIG. 8 is a flowchart of a method according to another embodiment of the present disclosure.

In another implementation of this embodiment of the present disclosure, as shown in FIG. 8, this embodiment of the present disclosure further includes the following steps.

110. The first switch receives a fourth packet sent by a fourth switch.

The fourth switch belongs to the first group of switches, and the fourth packet carries a third time.

111. The first switch sends a fourth time or a second delay to the fourth switch.

The fourth time is a time at which the first switch receives the fourth packet, and the second delay is a difference between the fourth time and the third time.

In this embodiment of the present disclosure, in the foregoing procedures, the first switch sends a delay in a transmission process of the fourth packet to the fourth switch, so that the fourth switch can determine, according to the delay in the transmission process of the fourth packet, a path used by the fourth switch to subsequently send a packet to the first switch. Therefore, accuracy of the fourth switch may be improved.

Figure 9:
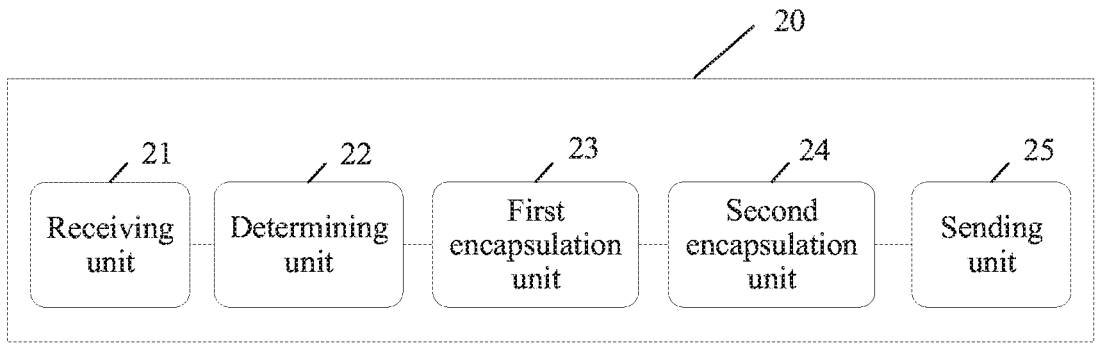
FIG. 9 is a schematic structural diagram of an apparatus according to an embodiment of the present disclosure.

Another embodiment of the present disclosure provides a Clos network load balancing apparatus 20. A Clos network includes a first group of switches and a second group of switches. Any switch in the first group of switches connects to at least one switch in the second group of switches. Any two switches in the first group of switches are connected using multiple paths, and any path in the multiple paths includes at least one switch in the second group of switches. The first group of switches includes a first switch and a second switch. Apparatus 20 is located on the first switch and, as shown in FIG. 9, includes a receiving unit 21, a determining unit 22, a first encapsulation unit 23, a second encapsulation unit 24, and a sending unit 25. Receiving unit 21 is configured to receive a first packet, a destination IP address of the first packet being an IP address of a terminal connected to the second switch. Determining unit 22 is configured to determine a third switch. The third switch is a switch in the second group of switches, and the first switch and the second switch are connected using the third switch. First encapsulation unit 23 is configured to perform tunnel encapsulation on the first packet. A destination IP address in a tunnel-encapsulated IP header is an IP address of the second switch. Second encapsulation unit 24 is configured to perform IP-in-IP encapsulation on the tunnel-encapsulated first packet. An IP-in-IP encapsulated inner IP header is the tunnel-encapsulated IP header, and a destination IP address in an IP-in-IP encapsulated outer IP header is an IP address of the third switch. Sending unit 25 is configured to send the IP-in-IP encapsulated first packet.

Further, determining unit 22 is configured to determine the third switch according to the IP address of the second switch and a parameter set of paths from the first switch to the second switch. The parameter set of the paths from the first switch to the second switch includes a parameter of at least one path in the multiple paths that connect the first switch and the second switch. The parameter includes an IP address of a switch on the path to which the parameter belongs and a metric value of the path to which the parameter belongs.

The tunnel-encapsulated IP header includes an identifier of the third switch and a first time, the first time being a current time of the first switch.

Further, the metric value of the path to which the parameter belongs includes a delay of the path to which the parameter belongs. Receiving unit 21 is further configured to receive a second packet sent by the second switch. The second packet is a tunnel-encapsulated packet, and a tunnel header of the second packet includes the identifier of the third switch. The tunnel header of the second packet further includes a first delay or a second time, the second time being a time at which the second switch receives the first packet and the first delay being a difference between the second time and the first time.

Figure 10:
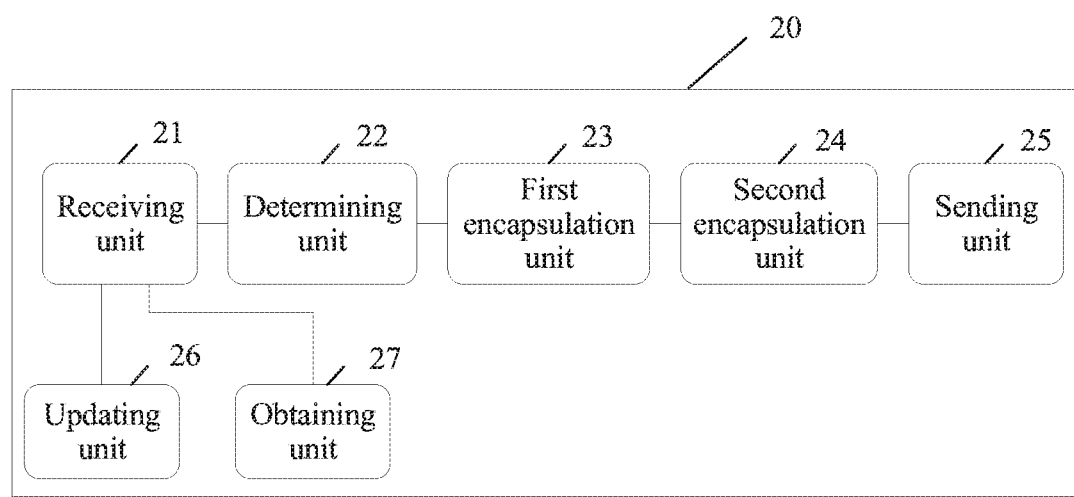
FIG. 10 is a schematic structural diagram of an apparatus according to an embodiment of the present disclosure.

Further, as shown in FIG. 10, apparatus 20 may further include an updating unit 26. Updating unit 26 is configured to update, to the first delay in the second packet, a delay that is of a path on which the third switch is located and that is in the parameter set of the paths from the first switch to the second switch, or update, to the difference between the second time in the second packet and the first time, a delay that is of a path on which the third switch is located and that is in the parameter set of the paths from the first switch to the second switch.

Further, receiving unit 21 is further configured to receive a third packet sent by the second switch, and the third packet carries the identifier of the third switch that is determined by the second switch and used by the first switch to send the packet to the second switch.

Further, as shown in FIG. 10, apparatus 20 may further include an obtaining unit 27 that is configured to determine the third switch according to the identifier of the third switch in the third packet.

Further, receiving unit 21 is further configured to receive a fourth packet sent by a fourth switch. The fourth switch belongs to the first group of switches, and the fourth packet carries a third time.

Sending unit 25 is further configured to send a fourth time or a second delay to the fourth switch. The fourth time is a time at which the first switch receives the fourth packet, and the second delay is a difference between the fourth time and the third time.

In this embodiment of the present disclosure, after receiving the packet, apparatus 20 first determines the third switch that connects the first switch and the second switch, and then performs tunnel encapsulation on the packet, the destination IP address in the tunnel-encapsulated IP header being the IP address of the second switch. Apparatus 20 performs IP-in-IP encapsulation on the tunnel-encapsulated packet, the destination IP address in the IP-in-IP encapsulated outer IP header being the IP address of the third switch. Therefore, when sending the packet, apparatus 20 first sends the packet to the third switch according to the IP address of the third switch in the IP-in-IP encapsulated outer IP header, and then sends the packet to the second switch according to the IP address of the second switch in the tunnel-encapsulated IP header. In a large-scale deep-layer Clos network architecture, (e.g., in a 5-stage Clos network), because a path from the first switch to the third switch is unique and a path from the third switch to the second switch is unique, the third switch may be changed in this forwarding manner, so as to change a path from the first switch to the second switch, allowing a traffic path in the large-scale deep-layer Clos network architecture to be finely controlled, to implement network load balancing.

Figure 11:
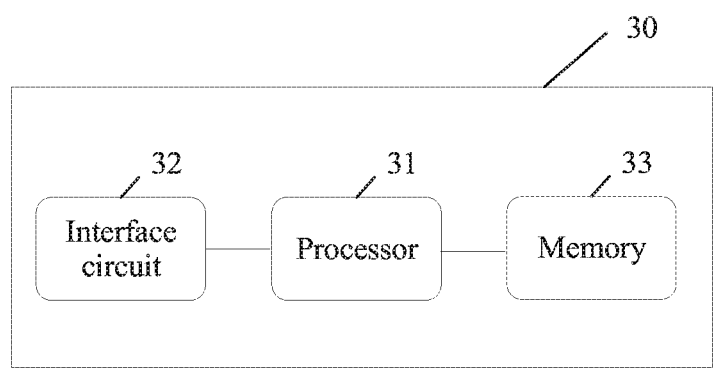
FIG. 11 is a schematic structural diagram of a communications device according to another embodiment of the present disclosure.

An embodiment of the present disclosure provides a communications device 30 used for Clos network load balancing. Communications device 30 is used as a first switch in a Clos network, and the Clos network includes a first group of switches and a second group of switches. Any switch in the first group of switches connects to at least one switch in the second group of switches. Any two switches in the first group of switches are connected using multiple paths, and any path in the multiple paths includes at least one switch in the second group of switches. The first group of switches includes the first switch and a second switch. As shown in FIG. 11, communications device 30 includes a processor 31, an interface circuit 32, and a memory 33. Processor 31, interface circuit 32, and memory 33 are mutually connected.

Processor 31 may be any one or a combination of a central processing unit (CPU), a network processor (NP), and a field programmable gate array (FPGA).

Interface circuit 32 may be any one or a combination of an Ethernet interface and a Fibre Channel. The Ethernet interface may be any one or a combination of an optical interface and electrical interface. Interface circuit 32 is configured to connect to a switch in the second group of switches.

Memory 33 may include a volatile memory, for example, a random access memory (RAM); or the memory may include a non-volatile memory, such as a read-only memory (ROM), a flash memory, a hard disk drive (HDD), or a solid state drive (SSD); or the memory may include a combination of the foregoing types of memories. Memory 33 may be configured to store a parameter set of paths from the first switch to the second switch.

Processor 31 is configured to receive a first packet using interface circuit 32, and a destination IP address of the first packet is an IP address of a terminal connected to the second switch.

Processor 31 is further configured to determine a third switch. The third switch is a switch in the second group of switches, and the first switch and the second switch are connected using the third switch. Processor 31 is further configured to perform tunnel encapsulation on the first packet. A destination IP address in a tunnel-encapsulated IP header is an IP address of the second switch. Processor 31 is further configured to perform IP-in-IP encapsulation on the tunnel-encapsulated first packet. An IP-in-IP encapsulated inner IP header is the tunnel-encapsulated IP header, and a destination IP address in an IP-in-IP encapsulated outer IP header is an IP address of the third switch.

Processor 31 is further configured to send the IP-in-IP encapsulated first packet using interface circuit 32.

The tunnel-encapsulated IP header includes an identifier of the third switch and a first time, the first time being a current time of the first switch.

In an implementation of this embodiment of the present disclosure, processor 31 is further configured to determine the third switch according to the IP address of the second switch and a parameter set of paths from the first switch to the second switch. The parameter set of the paths from the first switch to the second switch includes a parameter of at least one path in the multiple paths that connect the first switch and the second switch. The parameter includes an IP address of a switch on the path to which the parameter belongs and a metric value of the path to which the parameter belongs.

In another implementation of this embodiment of the present disclosure, the metric value of the path to which the parameter belongs includes a delay of the path to which the parameter belongs. Processor 31 is further configured to receive, using interface circuit 32, a second packet sent by the second switch. The second packet is a tunnel-encapsulated packet. A tunnel header of the second packet includes the identifier of the third switch, and the tunnel header of the second packet further includes a first delay or a second time. The second time is a time at which the second switch receives the first packet, and the first delay is a difference between the second time and the first time.

Processor 31 is further configured to update, to the first delay in the second packet, a delay that is of a path on which the third switch is located and that is in the parameter set of the paths from the first switch to the second switch, or update, to the difference between the second time in the second packet and the first time, a delay that is of a path on which the third switch is located and that is in the parameter set of the paths from the first switch to the second switch.

In another implementation of this embodiment of the present disclosure, processor 31 is further configured to receive, using the interface circuit 32, a third packet sent by the second switch, the third packet carrying the identifier of the third switch determined by the second switch, and to obtain the identifier of the third switch in the third packet.

In another implementation of this embodiment of the present disclosure, processor 31 is further configured to receive, using interface circuit 32, a fourth packet sent by a fourth switch and send a fourth time or a second delay to the fourth switch using interface circuit 32. The fourth switch belongs to the first group of switches, and the fourth packet carries a third time. The fourth time is a time at which the first switch receives the fourth packet, and the second delay is a difference between the fourth time and the third time.

In this embodiment of the present disclosure, after receiving the packet, communications device 30 first determines the third switch that connects the communications device 30 and the second switch, and then performs tunnel encapsulation on the packet. The destination IP address in the tunnel-encapsulated IP header is the IP address of the second switch. Communications device 30 performs IP-in-IP encapsulation on the tunnel-encapsulated packet, the destination IP address in the IP-in-IP encapsulated outer IP header being the IP address of the third switch. Therefore, when sending the packet, communications device 30 first sends the packet to the third switch according to the IP address of the third switch in the IP-in-IP encapsulated outer IP header, and then sends the packet to the second switch according to the IP address of the second switch in the tunnel-encapsulated IP header. In a large-scale deep-layer Clos network architecture, (e.g., in a 5-stage Clos network), because a path from communications device 30 to the third switch is unique and a path from the third switch to the second switch is unique, the third switch may be changed in this forwarding manner, so as to change a path from the communications device 30 to the second switch, allowing a traffic path in the large-scale deep-layer Clos network architecture to be finely controlled, to implement network load balancing.

The Clos network load balancing apparatus provided in embodiments of the present disclosure may implement the foregoing provided method embodiments. For specific function implementation, refer to descriptions in the method embodiments, and details are not described herein again. The Clos network load balancing method and apparatus provided in embodiments of the present disclosure may be applicable to a load balancing scenario in the Clos network, but is not limited thereto.

Persons of ordinary skill in the art will understand that all or some of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disk, a ROM/RAM, and the like.

The foregoing descriptions are merely example embodiments of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
    receiving, by a first switch in a first group of switches in a Clos network, a first packet, wherein a first destination Internet Protocol (IP) address of the first packet is a first IP address of a terminal connected to a second switch in the first group of switches, the Clos network comprising the first group of switches and a second group of switches, any switch in the first group of switches connecting to at least one switch in the second group of switches, any two switches in the first group of switches being connected using multiple paths, any path in the multiple paths comprising at least one switch in the second group of switches;
    determining, by the first switch, a third switch in the second group of switches, wherein a single path of the multiple paths connecting the first switch and the second switch comprises the third switch;
    performing, by the first switch, tunnel encapsulation on the first packet, wherein a second destination IP address in a tunnel-encapsulated IP header of the tunnel-encapsulated first packet is a second IP address of the second switch;
    performing, by the first switch, Internet Protocol in Internet Protocol (IP-in-IP) encapsulation on the tunnel-encapsulated first packet, wherein an IP-in-IP encapsulated inner IP header is the tunnel-encapsulated IP header, and a third destination IP address in an IP-in-IP encapsulated outer IP header of the IP-in-IP encapsulated first packet is a third IP address of the third switch; and
    sending, by the first switch, the IP-in-IP encapsulated first packet.

2. The method according to claim 1, wherein:
    determining, by the first switch, the third switch comprises determining, by the first switch, the third switch according to the second IP address of the second switch and a set of paths from the first switch to the second switch;
    each path of the set of paths from the first switch to the second switch comprises a corresponding parameter; and
    each corresponding parameter comprises an IP address of a switch on a corresponding path and comprises a metric value of the corresponding path.

3. The method according to claim 2, wherein the tunnel-encapsulated IP header comprises an identifier of the third switch and a first time, the first time being a current time of the first switch.

4. The method according to claim 3, wherein:
    the metric value of the corresponding path comprises a delay of the corresponding path; and
    after sending, by the first switch, the IP-in-IP encapsulated first packet, the method further comprises:
        receiving a second packet sent by the second switch, the second packet being a tunnel-encapsulated packet, a tunnel header of the second packet comprising the identifier of the third switch, the tunnel header of the second packet further comprising a first delay or a second time, the second time being a time at which the second switch receives the first packet and the first delay being a difference between the second time and the first time; and updating, by the first switch to the first delay in the second packet, the delay of the corresponding path on which the third switch is located and that is in the set of paths from the first switch to the second switch, or updating, to the difference between the second time in the second packet and the first time, the delay of the corresponding path on which the third switch is located and that is in the set of paths from the first switch to the second switch.

5. The method according to claim 1, wherein determining, by the first switch, the third switch comprises:
receiving, by the first switch, a third packet sent by the second switch, the third packet carrying an identifier of the third switch determined by the second switch; and
obtaining, by the first switch, the identifier of the third switch in the third packet.

6. The method according to claim 1, further comprising:
receiving, by the first switch, a fourth packet sent by a fourth switch, wherein the fourth switch belongs to the first group of switches and the fourth packet carries a third time; and
sending, by the first switch, a fourth time to the fourth switch, wherein the fourth time is a time at which the first switch receives the fourth packet.

7. The method according to claim 1, further comprising:
receiving, by the first switch, a fourth packet sent by a fourth switch, wherein the fourth switch belongs to the first group of switches and the fourth packet carries a third time; and
sending, by the first switch, a second delay to the fourth switch, wherein the second delay is a difference between a fourth time and the third time, the fourth time being a time at which the first switch receives the fourth packet.

8. A first switch, comprising:
a processor; and
a non-transitory computer-readable storage medium storing a program to be executed by the processor, the program comprising instructions that, when executed by the processor, cause the processor to:
receive a first packet, wherein a first destination Internet Protocol (IP) address of the first packet is a first IP address of a terminal connected to a second switch, wherein the first switch and the second switch are in a first group of switches of a Clos network, the Clos network comprising the first group of switches and a second group of switches, any switch in the first group of switches connecting to at least one switch in the second group of switches, any two switches in the first group of switches being connected using multiple paths, any path in the multiple paths comprising at least one switch in the second group of switches;
determine a third switch in the second group of switches, wherein a single path of the multiple paths connecting the first switch and the second switch comprises the third switch;
perform tunnel encapsulation on the first packet, wherein a second destination IP address in a tunnel-encapsulated IP header of the tunnel-encapsulated first packet is a second IP address of the second switch;
perform Internet Protocol in Internet Protocol (IP-in-IP) encapsulation on the tunnel-encapsulated first packet, wherein an IP-in-IP encapsulated inner IP header is the tunnel-encapsulated IP header, and a third destination IP address in an IP-in-IP encapsulated outer IP header of the IP-in-IP encapsulated first packet is a third IP address of the third switch; and
send the IP-in-IP encapsulated first packet.

9. The first switch according to claim 8, wherein:
the program comprises further instructions that cause the processor to determine the third switch according to the second IP address of the second switch and a set of paths from the first switch to the second switch;
each path of the set of paths from the first switch to the second switch comprises a corresponding parameter; and
each corresponding parameter comprises an IP address of a switch on a corresponding path and comprises a metric value of the corresponding path.

10. The first switch according to claim 9, wherein the tunnel-encapsulated IP header comprises an identifier of the third switch and a first time, the first time being a current time of the first switch.

11. The first switch according to claim 10, wherein:
the metric value of the corresponding path comprises a delay of the corresponding path; and
the program comprises further instructions that cause the processor to:
receive a second packet sent by the second switch, the second packet being a tunnel-encapsulated packet, a tunnel header of the second packet comprising the identifier of the third switch, the tunnel header of the second packet further comprising a first delay or a second time, the second time being a time at which the second switch receives the first packet, the first delay being a difference between the second time and the first time; and
update, to the first delay in the second packet, the delay of the corresponding path on which the third switch is located and that is in the set of paths from the first switch to the second switch, or update, to the difference between the second time in the second packet and the first time, the delay of the corresponding path on which the third switch is located and that is in the set of paths from the first switch to the second switch.

12. The first switch according to claim 8, wherein the program comprises further instructions that cause the processor to:
receive a third packet sent by the second switch, wherein the third packet carries an identifier of the third switch that is determined by the second switch and is used by the first switch to send the first packet to the second switch; and
determine the third switch according to the identifier of the third switch in the third packet.

13. The first switch according to claim 8, wherein the program comprises further instructions that cause the processor to:
receive a fourth packet sent by a fourth switch, wherein the fourth switch belongs to the first group of switches and the fourth packet carries a third time; and
send a fourth time to the fourth switch, wherein the fourth time is a time at which the first switch receives the fourth packet.

14. The first switch according to claim 8, wherein the program comprises further instructions that cause the processor to:
receive a fourth packet sent by a fourth switch, wherein the fourth switch belongs to the first group of switches and the fourth packet carries a third time; and send a second delay to the fourth switch, wherein the second delay is a difference between a fourth time and the third time, the fourth time being a time at which the first switch receives the fourth packet.

15. A non-transitory computer-readable medium comprising logic, the logic configured, when executed by one or more processors, to cause the one or more processors to perform operations comprising:

receiving, by a first switch in a first group of switches in a Clos network, a first packet, wherein a first destination Internet Protocol (IP) address of the first packet is a first IP address of a terminal connected to a second switch in the first group of switches, the Clos network comprising the first group of switches and a second group of switches, any switch in the first group of switches connecting to at least one switch in the second group of switches, any two switches in the first group of switches being connected using multiple paths, any path in the multiple paths comprising at least one switch in the second group of switches;

determining, by the first switch, a third switch in the second group of switches, wherein a single path of the multiple paths connecting the first switch and the second switch comprises the third switch;

performing, by the first switch, tunnel encapsulation on the first packet, wherein a second destination IP address in a tunnel-encapsulated IP header of the tunnel-encapsulated first packet is a second IP address of the second switch;

performing, by the first switch, Internet Protocol in Internet Protocol (IP-in-IP) encapsulation on the tunnel-encapsulated first packet, wherein an IP-in-IP encapsulated inner IP header is the tunnel-encapsulated IP header, and a third destination IP address in an IP-in-IP encapsulated outer IP header of the IP-in-IP encapsulated first packet is a third IP address of the third switch; and sending, by the first switch, the IP-in-IP encapsulated first packet.

16. The non-transitory computer-readable medium according to claim 15, wherein:

determining, by the first switch, the third switch comprises determining, by the first switch, the third switch according to the second IP address of the second switch and a set of paths from the first switch to the second switch;

each path of the set of paths from the first switch to the second switch comprises a corresponding parameter; and each corresponding parameter comprises an IP address of a switch on a corresponding path and comprises a metric value of the corresponding path.

17. The non-transitory computer-readable medium according to claim 16, wherein the tunnel-encapsulated IP header comprises an identifier of the third switch and a first time, the first time being a current time of the first switch.

18. The non-transitory computer-readable medium according to claim 17, wherein:

the metric value of the corresponding path comprises a delay of the corresponding path; and after sending, by the first switch, the IP-in-IP encapsulated first packet, the operations further comprise:

receiving a second packet sent by the second switch, the second packet being a tunnel-encapsulated packet, a tunnel header of the second packet comprising the identifier of the third switch, the tunnel header of the second packet further comprising a first delay or a second time, the second time being a time at which the second switch receives the first packet and the first delay being a difference between the second time and the first time; and updating, by the first switch to the first delay in the second packet, the delay of the corresponding path on which the third switch is located and that is in the set of paths from the first switch to the second switch, or updating, to the difference between the second time in the second packet and the first time, the delay of the corresponding path on which the third switch is located and that is in the set of paths from the first switch to the second switch.

19. The non-transitory computer-readable medium according to claim 15, wherein determining, by the first switch, the third switch comprises:

receiving, by the first switch, a third packet sent by the second switch, the third packet carrying an identifier of the third switch determined by the second switch; and obtaining, by the first switch, the identifier of the third switch in the third packet.

20. The non-transitory computer-readable medium according to claim 15, wherein the operations further comprise:

receiving, by the first switch, a fourth packet sent by a fourth switch, wherein the fourth switch belongs to the first group of switches and the fourth packet carries a third time; and sending, by the first switch, a fourth time or a second delay to the fourth switch, wherein the fourth time is a time at which the first switch receives the fourth packet and the second delay is a difference between the fourth time and the third time.

* * * * *